(12) United States Patent
Yen (10) Patent No.: US 6,381,130 B1
(45) Date of Patent: Apr. 30, 2002

(54) CASE FOR RECEIVING REMOVABLE HARD DISKS

(75) Inventor: Shou-Sung Yen, Taipei Hsien (TW)

(73) Assignee: Guanghsing Industrial Co., Ltd., Taipei Hsien (TW)

( * ) Notice: Subject to any disclaimer, the term of this patent is extended or adjusted under 35 U.S.C. 154(b) by 93 days.

(21) Appl. No.: 09/635,419

(22) Filed: Aug. 10, 2000

(51) Int. Cl.⁷ .............................. G06F 1/16; H05K 5/02
(52) U.S. Cl. ....................................... 361/685; 361/725
(58) Field of Search ................................ 361/685, 683, 361/724, 725, 797, 796, 687, 695

(56) References Cited

U.S. PATENT DOCUMENTS

| | | | | |
|---|---|---|---|---|
| 6,088,221 A | * | 7/2000 | Bolognia | 361/685 |
| 6,166,900 A | * | 12/2000 | Flynn et al. | 361/685 |
| 6,317,334 B1 | * | 11/2001 | Abruzzini et al. | 361/797 |

* cited by examiner

Primary Examiner—Lynn D. Feild
(74) Attorney, Agent, or Firm—Bacon & Thomas, PLLC (57) ABSTRACT

A case for receiving removable hard disks is disclosed. The case comprises a hard disk array circuit board, a plurality of sliding grooves provided on either side, a plurality of cartridges each disposed between two opposed sliding grooves, a plurality of sliding rails provided on either side being in cooperation with the sliding grooves such that a cartridge may slide between two opposed sliding rails, and a pivotal member provided in the front of the cartridge for inserting a SCSI disk into the cartridge, the cartridge capable of being inserted into the case by sliding the cartridge along the sliding groove, the cartridge and the case being secured together by clinging the pivotal member to the case. Hard disks of the invention are connected in a hard disk array configuration such that it is possible to remove a SCSI disk in a turn-on state of computer system and serially connect more SCSI disks than the prior art.

6 Claims, 8 Drawing Sheets

CASE FOR RECEIVING REMOVABLE HARD DISKS

FIELD OF THE INVENTION

The present invention relates to a case for receiving removable hard disks having improved characteristics.

BACKGROUND OF THE INVENTION

Conventionally, a SCSI disk is removably provided in a cartridge of a case. Cartridge is slidable in the case such that cartridge may be inserted into the case for connecting hard disk to computer system or remove cartridge from the case to disengage hard disk from computer system. However, it is only possible to insert one cartridge into the case for connecting such a conventional SCSI disk to the computer system. As a result, only one SCSI disk is available in the computer system. This limits the use. Further, it is impossible to have a number of SCSI disks being used simultaneously. In view of this, it is disadvantageous. Another type of case is disclosed wherein a number of cartridges may be disposed therein simultaneously. As such, a computer system can use the same number of SCSI disks simultaneously. However, the previous design suffered from a disadvantage. That is, a number of sliding rails provided in the case for facilitating the insertion of cartridges are intended for several SCSI disks use only. It is impossible to increase the number of SCSI disks. This also limits the use.

Thus, it is desirable to provide a case for receiving removable hard disks which are connected in a hard disk array configuration such that it is possible to remove a SCSI disk in a turn-on state of computer system as well as parallelly connect more SCSI disks in an array than the conventional one.

SUMMARY OF THE INVENTION

It is an object of the present invention to provide a case for receiving removable hard disks. The case comprises a hard disk array circuit board, a plurality of sliding grooves provided on either side, a plurality of cartridges each disposed between two opposed sliding grooves, a plurality of sliding rails provided on either side being in cooperation with the sliding grooves such that a cartridge may slide between two opposed sliding rails, and a pivotal member provided in the front of the cartridge for inserting a SCSI disk into the cartridge, the cartridge capable of being inserted into the case by sliding the cartridge along the sliding groove, the cartridge and the case being secured together by clinging the pivotal member to the case which in turn causes the SCSI disk to connect to the hard disk array circuit board. Alternatively, disengage the pivotal member from the case for sliding the cartridge along the, sliding groove, resulting in a separation of the cartridge from the case. Hard disks of the invention are connected in a hard disk array configuration such that it is possible to remove a SCSI disk in a turn-on state of computer system as well as paraellelly connect more SCSI disks in an array than the conventional one.

The above and other objects, features and advantages of the present invention will become apparent from the following detailed description taken with the accompanying drawings.

DETAILED DESCRIPTION OF THE PREFERRED EMBODIMENTS

Figure 1:
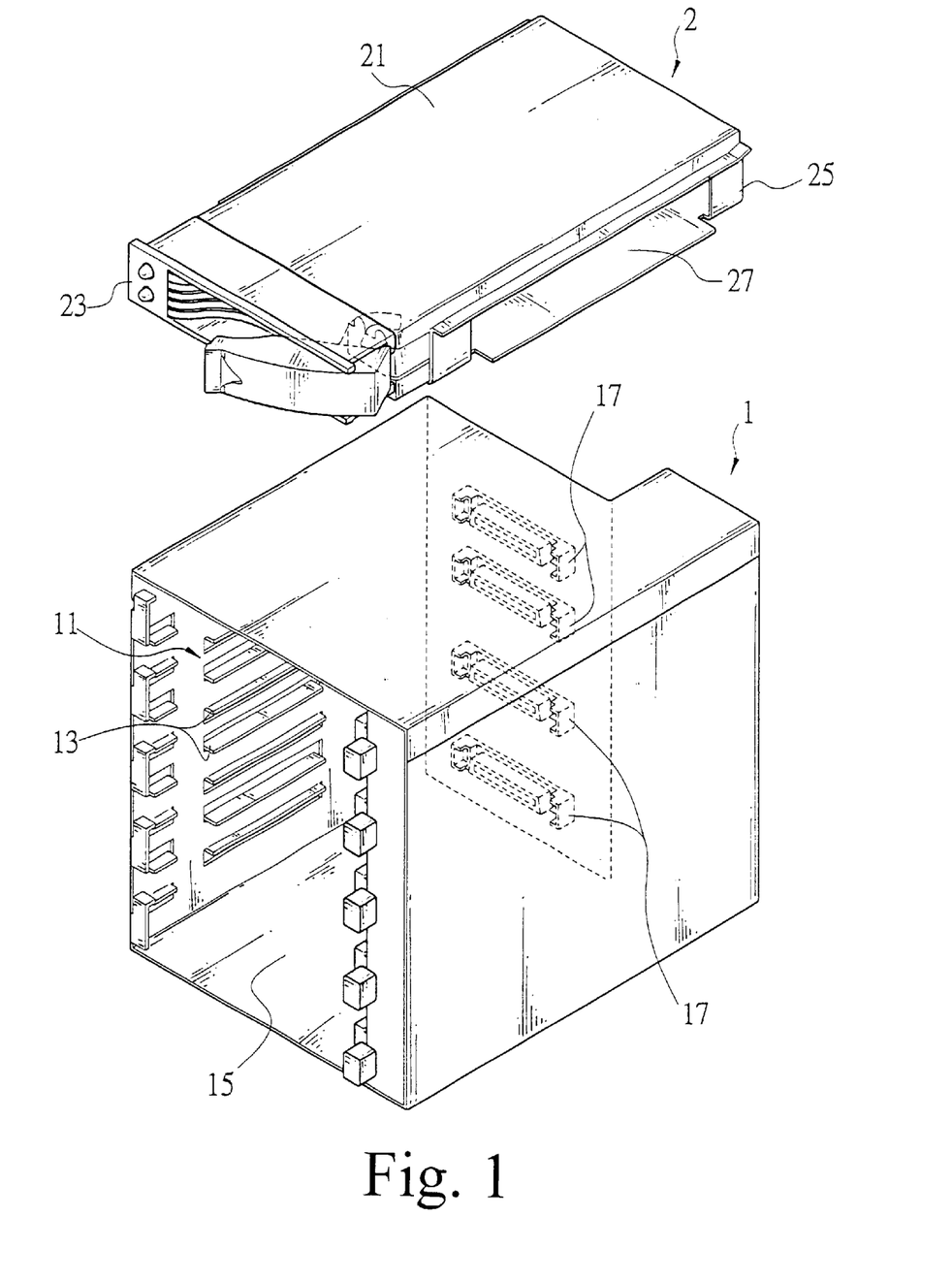
FIG. 1 is a perspective view of a preferred embodiment of case for receiving removable hard disks according to the invention where cartridge separated from the case.
Figure 2:
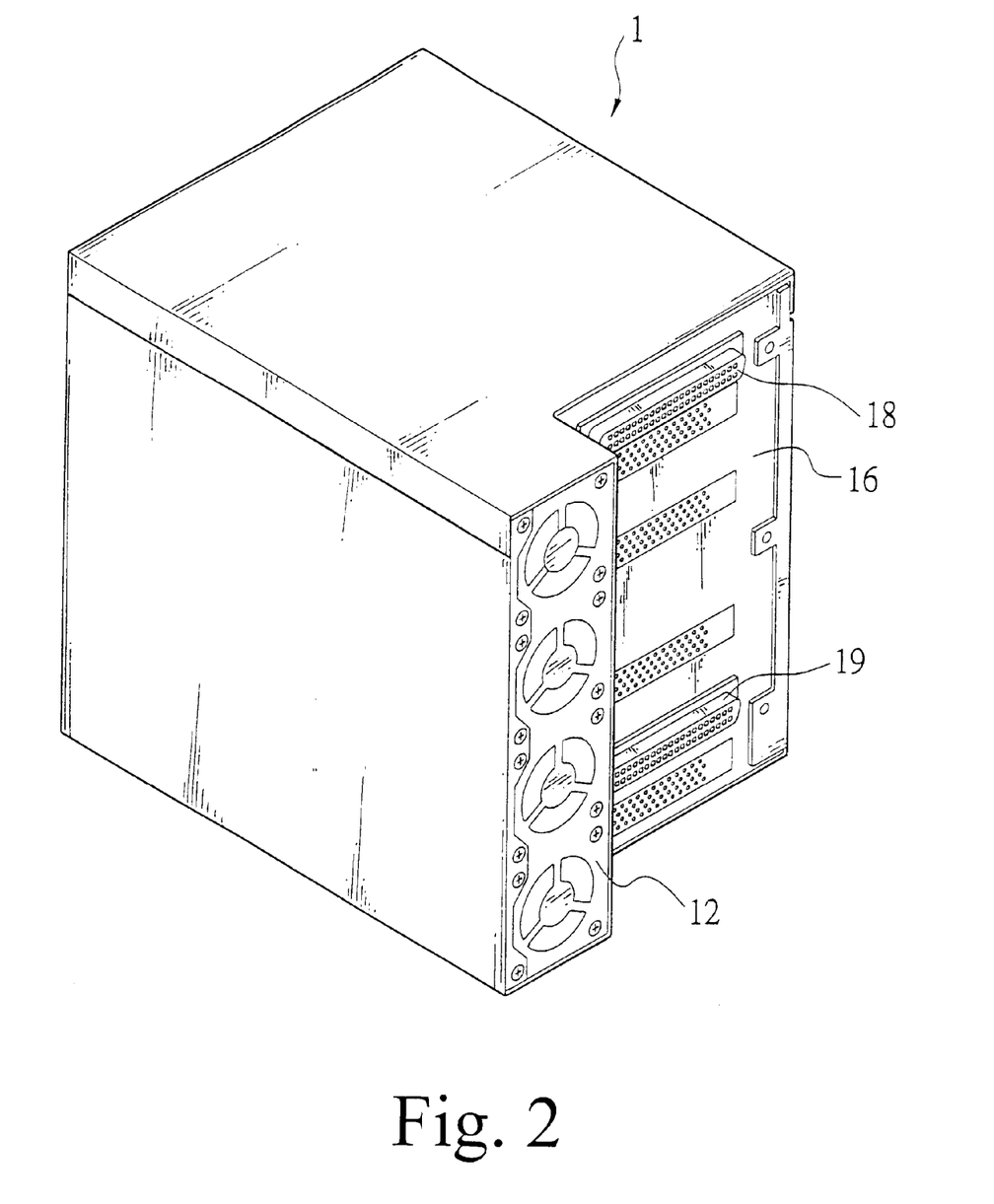
FIG. 2 is a perspective view of FIG. 1 viewed from the rear.

Referring to FIGS. 1 and 2, there is shown the invention comprising a case 1 and a plurality of cartridges 2. Case 1 is threadedly secured to an expansion slot in the computer housing. Note that it is not limited to such configuration in the practical implementation. For example, it is possible to threadedly secure case 1 in the hard disk array housing or connect to the computer system through a cable (not shown). Case 1 has a receiving space sufficient to hold the plurality of cartridges 2. A plurality of horizontally parallel sliding grooves 11 are provided on either side of the case 1. Further, a plurality of sliding rails 13 are horizontally parallel provided on either side of the case 1. As such, cartridge 2 may slide between opposed sliding rails 13 for inserting into case 1. Case 1 comprises an opening 15 for permitting cartridge 2 to insert thereinto.

Referring to FIG. 2 specifically, a circuit board 16 is provided in the rear of case 1 opposed to opening 15. A plurality of first connectors 17 (e.g., SCA connectors) are provided on the inner surface (i.e., opposed to cartridge 2) of circuit board 16, while a second connector (e.g., SCSI connector) 18 and a third connector (e.g., SCSI connector) 19 are provided on the outer surface of circuit board 16. Each of first connectors 17 is connected to second connector 18 and third connector 19 respectively. The second connector 18 is inlet being connected to the computer system through a hard disk array controller (not shown). The third connector 19 is outlet. It is possible to parallelly connect to a plurality of cases 1 as needed in order to install more cartridges 2 for use.

Hard disk 21 (FIG. 1) removably provided in cartridge 2 is connected to the first connectors 17 when cartridge 2 is inserted into case 1. Thus, hard disk array controller of hard disk is connected to the computer system. Further, it is possible to remove a hard disk in a turn-on state of computer system. A plurality of fans 12 are provided on the side adjacent to the circuit board 16. Each of fans 12 is connected to circuit board 16 through a power cord such that fans 12 can be activated by the power supplied by circuit board 16. Fans 12 function as dissipating heat generated by hard disks 21 in the case 1 for preventing hard disks 21 from being damaged due to overheat.

Referring to FIG. 1 specifically, hard disk 21 is removably provided in cartridge 2. Cartridge 2 have a front panel 23, an opening 25 in the rear such that the connectors in the rear of hard disk 21 can be connected to first connectors 17, and a slide 27 provided in either side corresponding to sliding rail 13, slide 27 having a U-shaped cross-section such that cartridge 2 can slide along sliding rails 13 by means of slides 27. Hard disk 21 is connected to circuit board 16 when cartridge 2 is completely inserted into case 1. Alternatively, hard disk 21 is disengaged from circuit board 16 when cartridge 2 is removed from case 1.

Figure 3:
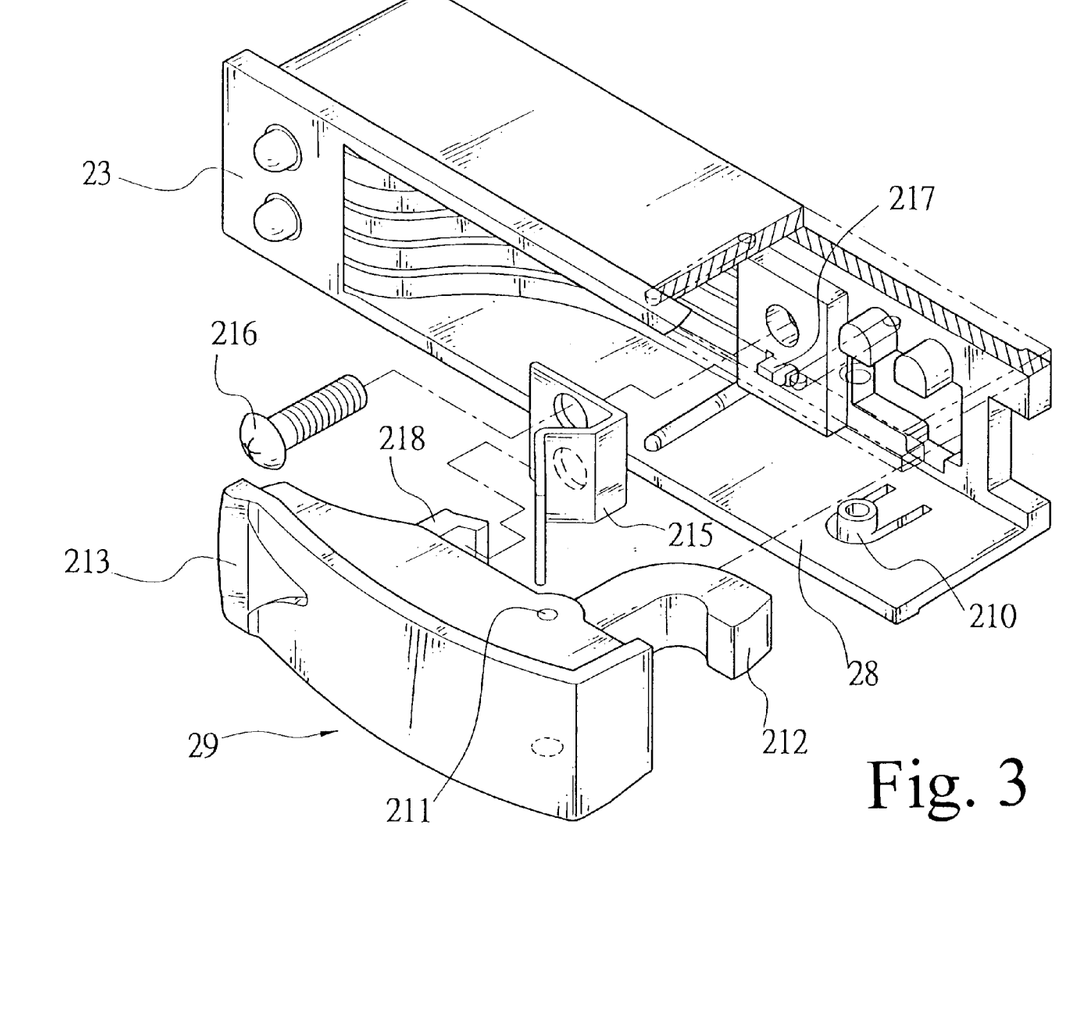
FIG. 3 is an exploded view of pivotal member separated from the front panel of FIG. 1.
Figure 4:
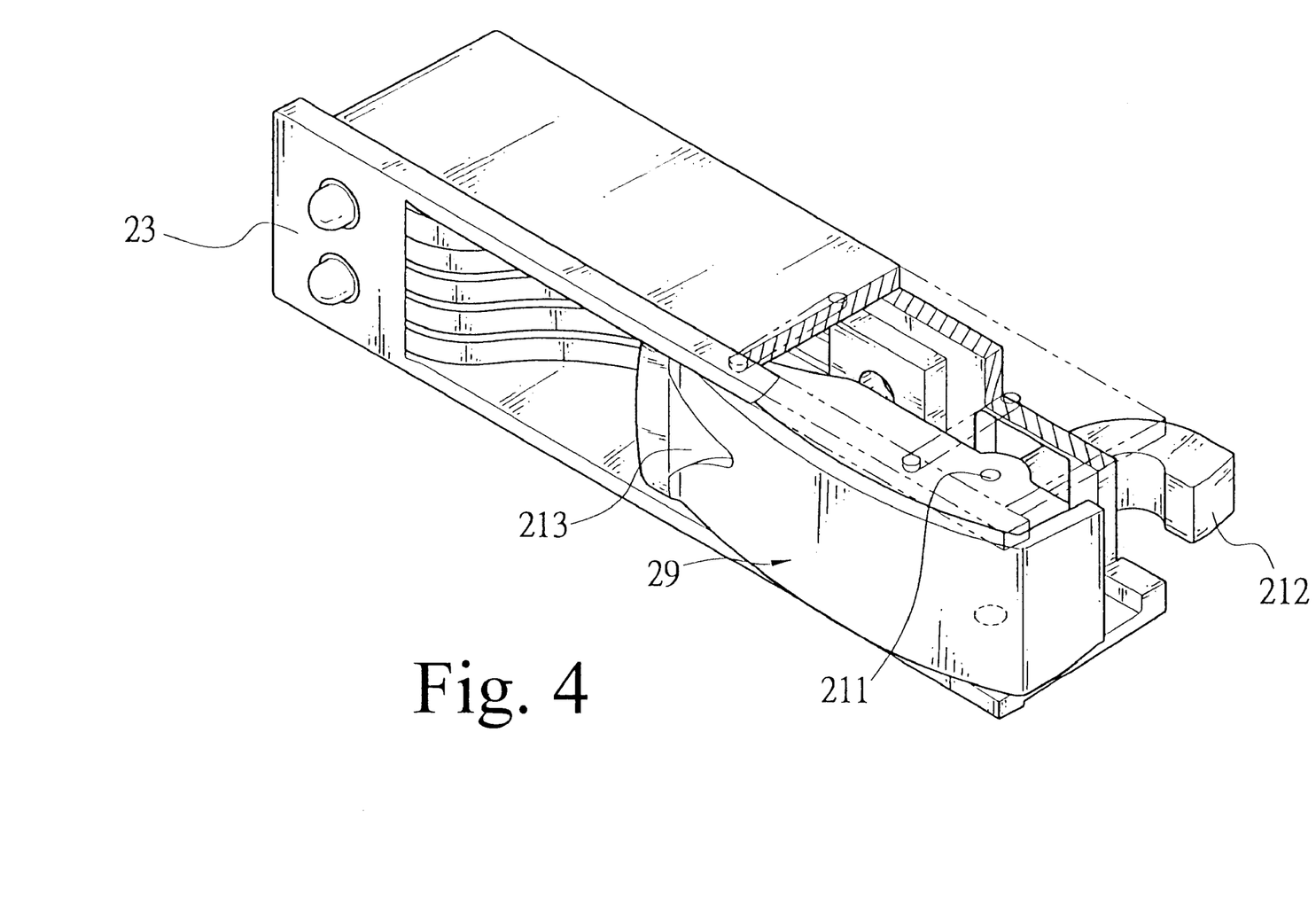
FIG. 4 is a perspective view of FIG. 3 where pivotal member assembled with the front panel.

Referring to FIGS. 3 and 4, an opening 28 is provided in a part of front panel 23. A pivotal member 29 is pivotably provided on opening 28. A projection 20 is provided on front panel 23 adjacent to the pivotal member 29 (i.e., on the right side as seen in FIGS. 3 and 4). An axle 210 is provided in top and bottom inner surfaces of the opening 28 respectively. Two opposed holes 211 are provided on pivotal member 29 wherein each hole 211 corresponds to an axle 210. As such, pivotal member 29 may pivot about opening 28 by securing axles 210 to holes 211.

Figure 5:
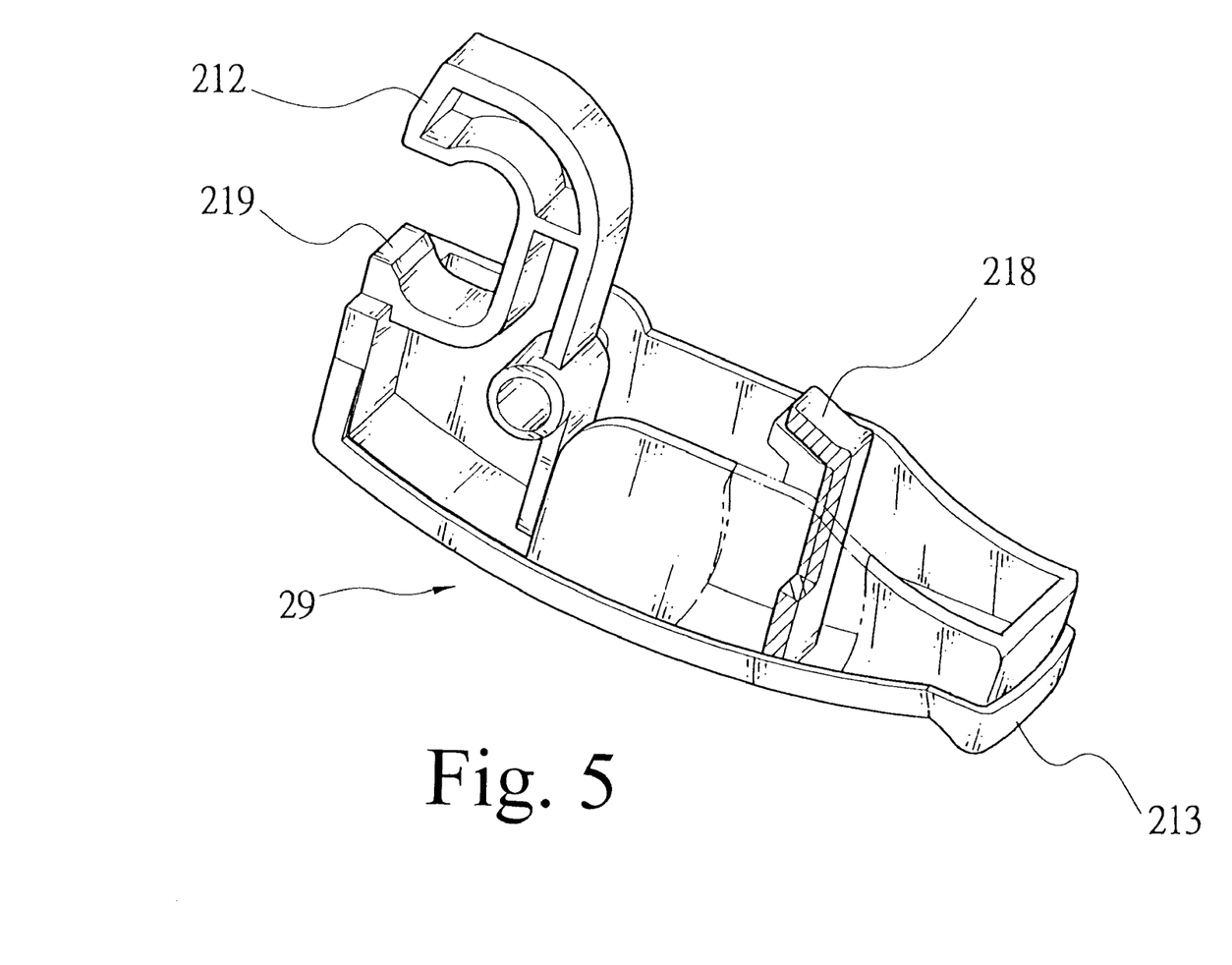
FIG. 5 is a perspective view of the pivotal member.

Referring to FIGS. 3 and 5, an arm 212 is provided on one side of pivotal member 29 (i.e., adjacent to the case 1), while a handle 213 is provided on the other side of pivotal member 29. A claw 219, on one end of arm 212, is disposed in the pivotal member 29. As such, arm 212 may engage with case 1 or disengage from case 1 by activating handle 213.

Figure 6:
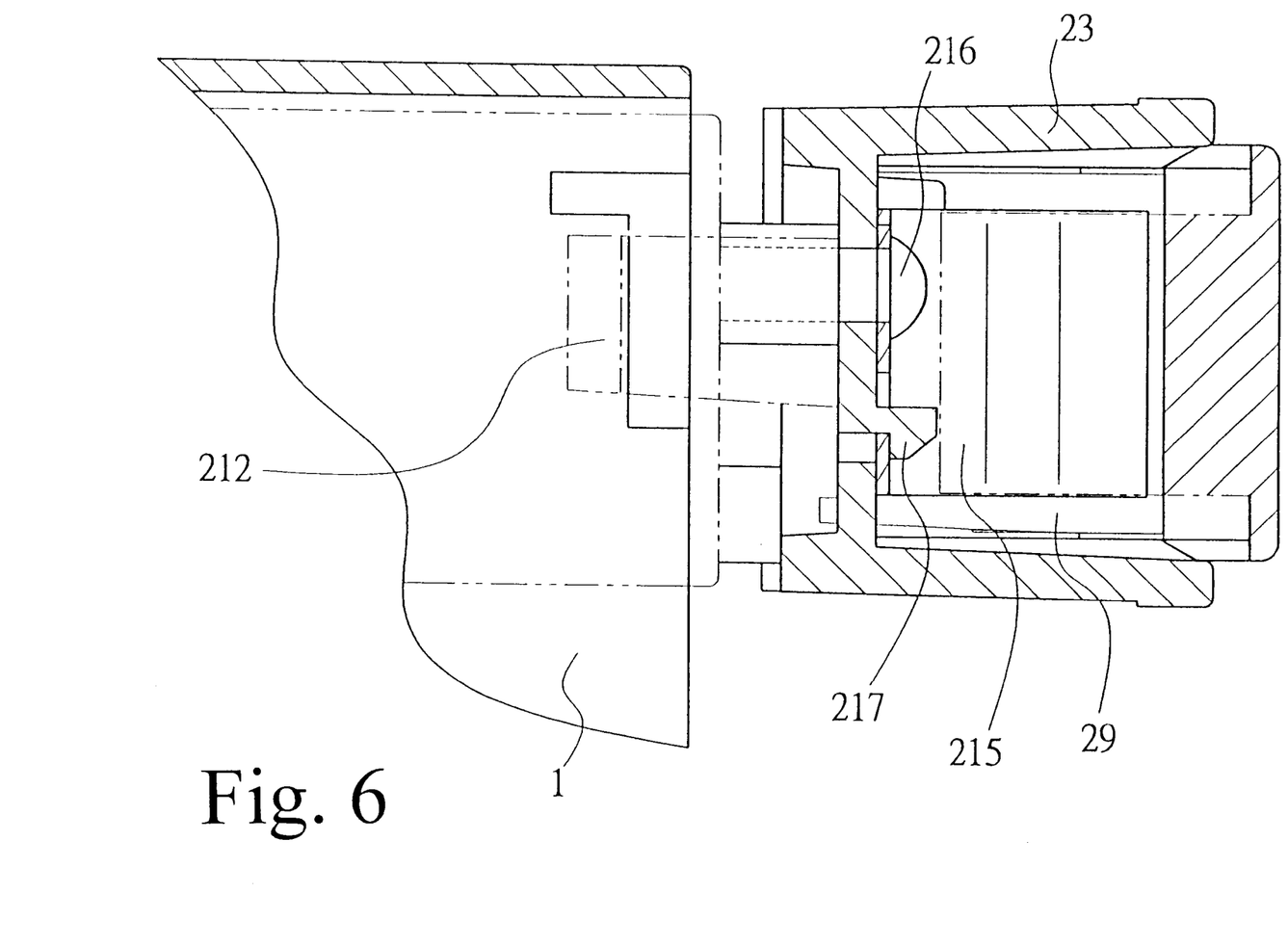
FIG. 6 is a cross-sectional view of the pivotal member.

Referring to FIGS. 3 and 6, an engagement member 215 is provided on front panel 23 opposed to handle 213. Engagement member 215 is threadedly secured to front panel 23 by means of a fastener 216 (e.g., screw as shown but it is not limited to be screw in the practical implementations) and a latch 217 on front panel 23. A latched member 218 is provided on handle 213 being engaged with engagement member 215. When arm 212 becomes disengaged from case 1, activate handle 213 to cause pivotal member 29 to secure to front panel 23 by engaging the engagement member 215 with the latched member 218.

Figure 7:
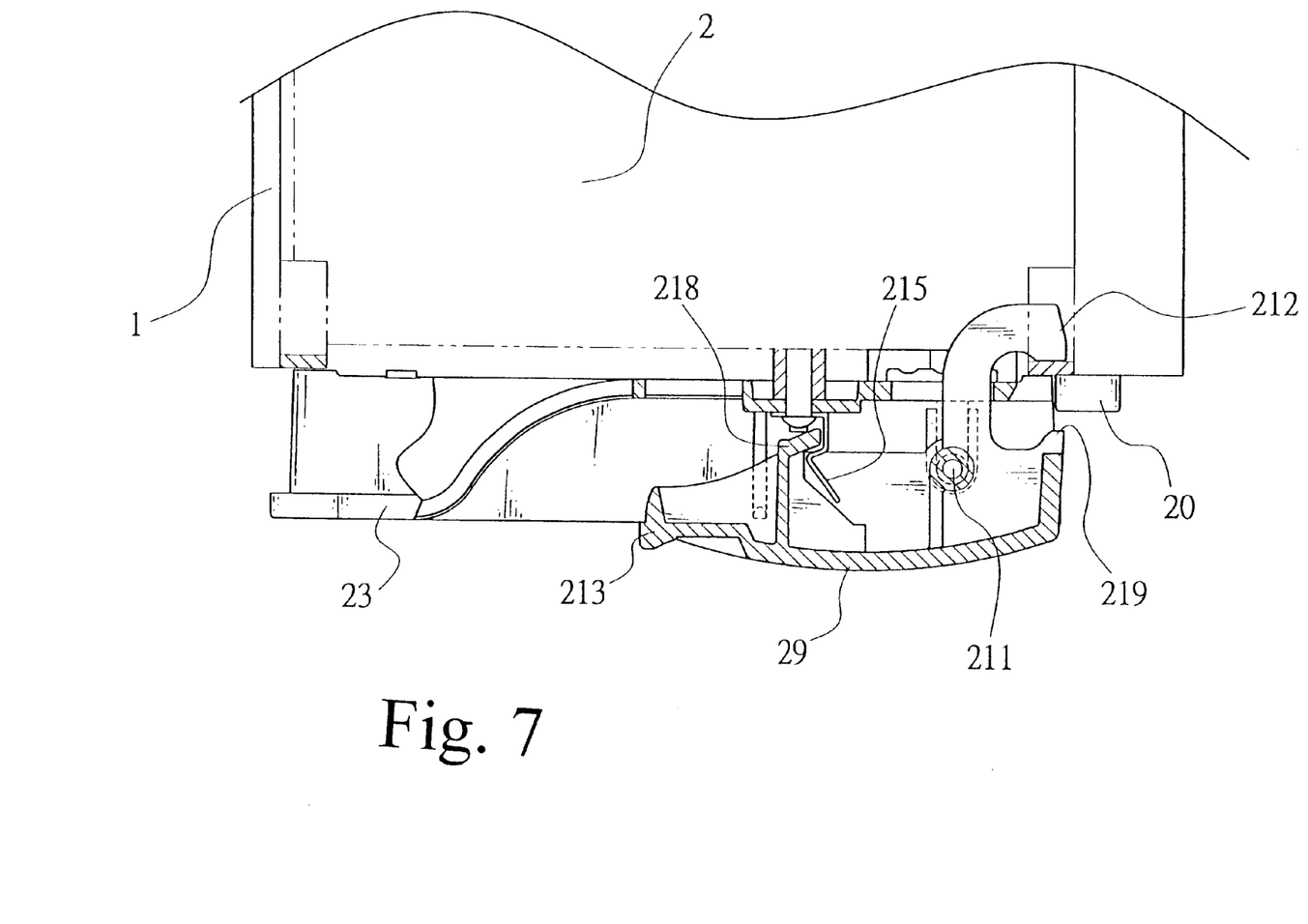
FIG. 7 is a partial top view in part section showing the pivotal member locked such that cartridge may not remove from the case.
Figure 8:
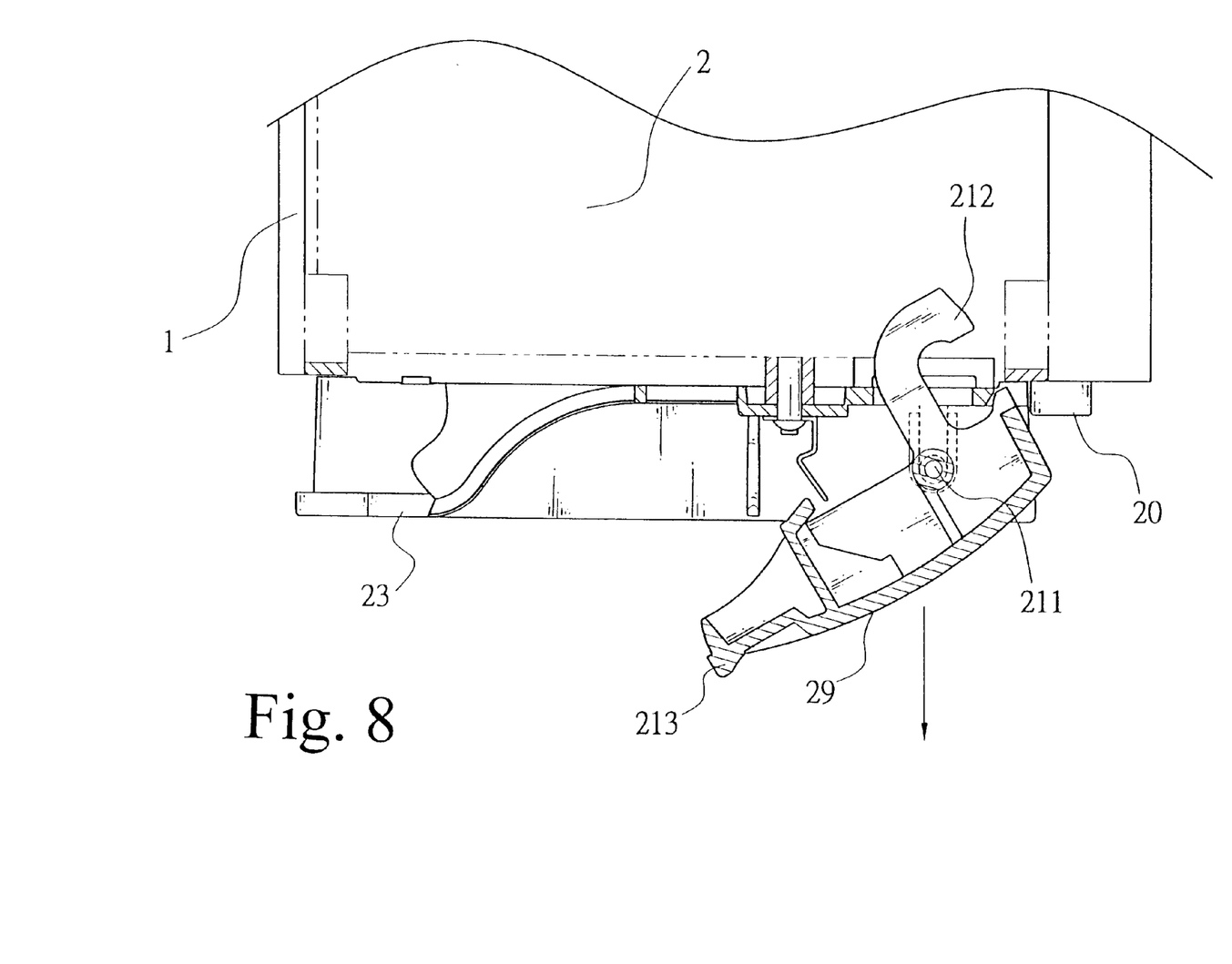
FIG. 8 is similar to FIG. 7 where showing the pivotal member unlocked such that cartridge may remove from the case.

Referring to FIGS. 7 and 8, there is an illustration of the operation of the invention. Cartridge 2 may be inserted into case 1 by sliding cartridge 2 on the sliding grooves 11 inwardly. As a result, hard disk 21 is connected to circuit board 16. At this time, cartridge 2 and case 1 are secured together by clinging pivotal member 29 to case 1. Alternatively, pivot the handle 213 of pivotal member 29 to disengage the latched member 218 from engagement member 215. Then apply a force on handle 213, i.e., handle 213 as force applying point, hole 211 as fulcrum, and the contact point of claw 219 and projection 20 as force sustaining point. As a result, arm 212 disengages from case 1. At the same time, connectors in the rear of hard disk 21 disengages from first connectors 17. Then pull cartridge 2 such that cartridge 2 may slide on sliding grooves 11 until cartridge 2 completely pulls out of the case 1. The benefits of this invention includes:

1. It is possible to remove a hard disk in a turn-on state of computer system due to the hard disk array configuration of the invention.
2. It may parallelly connect more hard disks in an array than the conventional one.

While the invention herein disclosed has been described by means of specific embodiments, numerous modifications and variations could be made thereto by those skilled in the art without departing from the scope and spirit of the invention set forth in the claims.

What is claimed is:

1. A device for receiving removable hard disks comprising:
    a case threadedly secured to an expansion slot in a housing of a computer system including a plurality of horizontally parallel sliding grooves provided on either side, a plurality of sliding rails horizontally parallel provided on either side, a front opening, a circuit board provided in the rear opposed to the front opening, a plurality of first connectors provided on the inner surface of the circuit board, a second connector and a third connector both provided on the outer surface of the circuit board wherein each of the first connectors is connected to the second connector and the third connector respectively, the second connector is an inlet being connected to the computer system through a hard disk array controller, the third connector is an outlet being serially connected to a plurality of second cases, and a plurality of fans provided on the rear adjacent to the circuit board, each of the fans connected to the circuit board through a power cord such that the fans can be activated by the power supplied by the circuit board;
    a plurality of cartridges each for receiving one of the hard disks including a front panel having an opening, an opening in the rear such that the connectors in the rear of the hard disk can be connected to the first connectors, and a slide provided in either side corresponding to the sliding rail, each slide having a U-shaped cross-section such that the cartridge can slide along the sliding rails by means of the slides, the cartridge is inserted into the case from the front opening of the case, or the cartridge is removed from the case in a turn-on state of the computer system; and
    a pivotal means pivotably provided on the opening of the front panel including an axle provided in the top and the bottom inner surfaces of the opening of the front panel respectively, two opposed holes provided, each hole corresponding to each axle such that the pivotal means pivots about the opening of the front panel by securing the axles to the holes, an arm provided on one side of the pivotal means adjacent to the case, and a handle provided on the other side of the pivotal means such that the arm engages with the case or disengages from the case by activating the handle.

2. The device of claim 1, further comprising an engagement member provided on the front panel opposed to the handle, a fastener, a latch provided on the front panel, an engagement member threadedly secured to the front panel by means of the fastener and the latch, and a latched member provided on the handle being engaged with the engagement member wherein when the arm becomes disengaged from the case, activate the handle to cause the pivotal means to secure to the front panel by engaging the engagement member with the latched member.

3. The device of claim 1, further comprising a projection provided on the front panel adjacent to the pivotal means and a claw provided in the pivotal means such that pivot the handle of the pivotal means to disengage the latched member from the engagement member, apply a force on the handle to cause the handle served as force applying point, the holes served as fulcrum, and the contact point of the claw and the projection served as force sustaining point such that the arm disengages from the case, the connectors in the rear of the hard disk disengages from the first connectors, and pull the cartridge such that the cartridge slides on the sliding grooves until the cartridge completely pulls out of the case.

4. The device of claim 1, wherein each of the first connectors is a SCA connector.

5. The device of claim 1, wherein the second connector is a SCSI connector.

6. The device of claim 1, wherein the third connector is a SCSI connector.

* * * * *